US010050473B2

(12) United States Patent
Byrne et al.

(10) Patent No.: US 10,050,473 B2
(45) Date of Patent: Aug. 14, 2018

(54) ARTICLES WITH ELECTRICAL CHARGING SURFACES (71) Applicants: Norman R. Byrne, Ada, MI (US);
Robert L. Knapp, Rockford, MI (US);
Timothy J. Warwick, Sparta, MI (US);
Roger D. Burdi, Grand Rapids, MI (US)

(72) Inventors: Norman R. Byrne, Ada, MI (US);
Robert L. Knapp, Rockford, MI (US);
Timothy J. Warwick, Sparta, MI (US);
Roger D. Burdi, Grand Rapids, MI (US)

( * ) Notice: Subject to any disclaimer, the term of this patent is extended or adjusted under 35 U.S.C. 154(b) by 0 days.

(21) Appl. No.: 15/255,221

(22) Filed: Sep. 2, 2016

(65) Prior Publication Data

US 2016/0372962 A1 Dec. 22, 2016

Related U.S. Application Data (63) Continuation of application No. 14/501,165, filed on Sep. 30, 2014, now Pat. No. 9,438,070.

(60) Provisional application No. 61/884,440, filed on Sep. 30, 2013.

(51) Int. Cl.
*H02J 7/00* (2006.01)
*H02J 50/10* (2016.01)
*H02J 5/00* (2016.01)

(52) U.S. Cl.
CPC ............. *H02J 50/10* (2016.02); *H02J 5/005* (2013.01); *H02J 7/0042* (2013.01)

(58) Field of Classification Search
CPC ...................................... H02J 7/025

USPC .................................. 320/108, 114
See application file for complete search history.

(56) References Cited

U.S. PATENT DOCUMENTS

| | | |
|---|---|---|
| 5,171,159 A | 12/1992 | Byrne |
| 5,575,668 A | 11/1996 | Timmerman |
| 5,959,433 A | 9/1999 | Rohde |
| 6,028,267 A | 2/2000 | Byrne |
| 6,028,413 A | 2/2000 | Brockmann |
| 6,036,516 A | 3/2000 | Byrne |
| 6,290,518 B1 | 9/2001 | Byrne |
| 6,379,182 B1 | 4/2002 | Byrne |
| 6,436,299 B1 | 8/2002 | Baarman et al. |
| 6,756,697 B2 | 6/2004 | Mizutani et al. |
| 6,803,744 B1 | 10/2004 | Sabo |
| 6,967,462 B1 | 11/2005 | Landis |
| 7,183,504 B2 | 2/2007 | Byrne |
| 7,212,414 B2 | 5/2007 | Baarman |

(Continued)

*Primary Examiner* — Edward Tso
*Assistant Examiner* — Ahmed Omar
(74) *Attorney, Agent, or Firm* — Gardner, Linn, Burkhart & Ondersma LLP (57) ABSTRACT An electrical article with cord-free charging zone provides users in a work area with access to low-voltage charging for portable electronic devices, in which electrical current is conveyed upon placement of an electronic device within the charging zone. The electrical article is configured for use in a work area, and includes a housing, a low voltage charging zone with power unit, and an electrical power input. The charging zone is defined along at least a portion of an upper surface of the housing. The low voltage power unit is operable to cordlessly convey electrical power to a portable electrical or electronic device that is positioned at the low voltage charging zone.

19 Claims, 7 Drawing Sheets

(56) References Cited

U.S. PATENT DOCUMENTS

| | | |
|---|---|---|
| 7,222,031 B2 | 5/2007 | Heatley |
| 7,233,222 B2 | 6/2007 | Baarman et al. |
| 7,262,700 B2 | 8/2007 | Hsu |
| 7,355,150 B2 | 4/2008 | Baarman et al. |
| 7,392,068 B2 | 6/2008 | Dayan et al. |
| 7,399,202 B2 | 7/2008 | Dayan et al. |
| 7,443,057 B2 | 10/2008 | Nunally |
| 7,465,178 B2 | 12/2008 | Byrne |
| 7,633,263 B2 | 12/2009 | Toya |
| 7,736,178 B2 | 6/2010 | Byrne |
| 7,863,861 B2 | 1/2011 | Cheng et al. |
| 7,878,845 B2 | 2/2011 | Byrne |
| 7,887,113 B2 | 2/2011 | Lambarth et al. |
| 8,061,864 B2 | 11/2011 | Metcalf et al. |
| 8,106,539 B2 | 1/2012 | Schatz et al. |
| 8,262,244 B2 | 9/2012 | Metcalf et al. |
| 8,283,812 B2 | 10/2012 | Azancot et al. |
| 8,295,036 B2 | 10/2012 | Byrne |
| 8,395,353 B2 | 3/2013 | Wang et al. |
| 8,398,408 B1 | 3/2013 | Hansen et al. |
| 8,421,407 B2 | 4/2013 | Johnson |
| 8,444,432 B2 | 5/2013 | Byrne et al. |
| 8,456,038 B2 | 6/2013 | Azancot et al. |
| 8,480,429 B2 | 7/2013 | Byrne |
| 8,482,160 B2 | 7/2013 | Johnson et al. |
| 8,487,478 B2 | 7/2013 | Kirby et al. |
| 8,497,601 B2 | 7/2013 | Hall et al. |
| 8,558,411 B2 | 10/2013 | Baarman et al. |
| 8,558,661 B2 | 10/2013 | Zeine |
| 8,559,172 B2 | 10/2013 | Byrne |
| 8,581,444 B2 | 11/2013 | Urano |
| 8,618,695 B2 | 12/2013 | Azancot et al. |
| 8,721,124 B2 | 5/2014 | Byrne et al. |
| 8,937,407 B2 | 1/2015 | Byrne et al. |
| 8,951,054 B2 | 2/2015 | Byrne et al. |
| 9,148,006 B2 | 9/2015 | Byrne et al. |
| 2002/0171335 A1 | 11/2002 | Held |
| 2003/0048254 A1 | 3/2003 | Huang |
| 2003/0202317 A1 | 10/2003 | Jans |
| 2004/0026998 A1 | 2/2004 | Henriott et al. |
| 2004/0150934 A1 | 8/2004 | Baarman |
| 2004/0189246 A1 | 9/2004 | Bulai et al. |
| 2007/0182367 A1 | 8/2007 | Partovi |
| 2007/0279002 A1 | 12/2007 | Partovi |
| 2008/0001572 A9 | 1/2008 | Baarman et al. |
| 2008/0079392 A1 | 4/2008 | Baarman et al. |
| 2008/0166965 A1 | 7/2008 | Greene et al. |
| 2008/0169910 A1 | 7/2008 | Greene et al. |
| 2008/0200050 A1 | 8/2008 | Byrne |
| 2009/0045772 A1 | 2/2009 | Cook et al. |
| 2009/0212636 A1 | 8/2009 | Cook et al. |
| 2009/0212638 A1 | 8/2009 | Johnson |
| 2009/0230777 A1 | 9/2009 | Baarman et al. |
| 2009/0278494 A1 | 11/2009 | Randall |
| 2010/0038970 A1 | 2/2010 | Cook et al. |
| 2010/0127660 A1 | 5/2010 | Cook et al. |
| 2010/0201201 A1 | 8/2010 | Mobarhan et al. |
| 2010/0244584 A1 | 9/2010 | Azancot et al. |
| 2010/0259401 A1 | 10/2010 | Azancot et al. |
| 2010/0290215 A1 | 11/2010 | Metcalf et al. |
| 2011/0062789 A1 | 3/2011 | Johnson et al. |
| 2011/0121660 A1 | 5/2011 | Azancot et al. |
| 2011/0175544 A1 | 7/2011 | Jong |
| 2011/0193417 A1 | 8/2011 | Hirasaka et al. |
| 2011/0241607 A1 | 10/2011 | Wiegers |
| 2011/0241614 A1 | 10/2011 | Yeh |
| 2011/0248575 A1 | 10/2011 | Kim et al. |
| 2011/0260548 A1 | 10/2011 | Urano |
| 2012/0113576 A1 | 5/2012 | Cooper et al. |
| 2012/0113645 A1* | 5/2012 | Liao ............... H02J 7/0042 362/253 |
| 2012/0117730 A1 | 5/2012 | Lemire et al. |
| 2012/0153731 A9 | 6/2012 | Kirby et al. |
| 2012/0228953 A1 | 9/2012 | Kesler et al. |
| 2012/0235474 A1 | 9/2012 | Mannino et al. |
| 2012/0299539 A1 | 11/2012 | Jones et al. |
| 2012/0312196 A1 | 12/2012 | Newkirk |
| 2013/0049482 A1 | 2/2013 | Rofe et al. |
| 2013/0057203 A1 | 3/2013 | Jones et al. |
| 2013/0141038 A1 | 6/2013 | Papa |
| 2013/0175986 A1 | 7/2013 | Senatori |
| 2013/0200717 A1 | 8/2013 | Bourilkov et al. |
| 2013/0207478 A1* | 8/2013 | Metcalf ............... A47C 7/70 307/104 |
| 2013/0234481 A1 | 9/2013 | Johnson |
| 2013/0285606 A1 | 10/2013 | Ben-Shalom et al. |
| 2015/0091389 A1 | 4/2015 | Byrne et al. |

* cited by examiner

ARTICLES WITH ELECTRICAL CHARGING SURFACES

CROSS REFERENCE TO RELATED APPLICATION

The present application is a continuation of U.S. patent application Ser. No. 14/501,165, filed Sep. 30, 2014, which claims the benefit of U.S. provisional application Ser. No. 61/884,440, filed Sep. 30, 2013, which are hereby incorporated herein by reference in their entireties.

FIELD OF THE INVENTION

The present invention relates to electrical power systems for providing users with access to cordless electrical power within a work area.

BACKGROUND OF THE INVENTION

High voltage AC electrical power receptacles or outlets are commonly located in work areas, such as at or near work surfaces, in walls, in floors, and in ceilings. Low voltage and electronic data receptacles are also becoming increasingly common with the increase of small and hand-held electronic devices, from laptop computers to smart phones. Such portable electronic devices typically require a direct electrical connection to a low voltage power source, such as for charging purposes, so that a separate electrical cord and/or a DC transformer are also needed to power such devices from electrical outlets that are commonly available.

SUMMARY OF THE INVENTION

The present invention provides electrical articles that include low voltage charging areas for powering or charging portable electronic devices that are placed in, on, or near the charging area of a particular article or device. The article or device typically also provides some other function or electrical access that is useful in a work area, such as direct-connection electrical outlets, lighting, audio or video display, or the like. Thus, a user may simply place a compatible portable electronic device within a charging area of the electrical article, and charge or supply electrical current to the device without need for separate wiring or an extra step of establishing a direct electrical connection between the electrical article and the portable electronic device.

According to one aspect of the present invention, an electrical article is configured for use in a work area, and includes a housing with an upper surface, a low voltage DC charging area, a low voltage DC power unit, and an electrical power input. The low voltage DC charging area is defined along at least a portion of the upper surface of the housing, and the low voltage DC power unit is disposed in the housing. The low voltage DC power unit has a low voltage DC power output at the low voltage charging area. The electrical power input is configured to direct electrical power from a power source, such as a high voltage AC power source, to the low voltage DC power unit. The low voltage DC power unit is operable to convey low voltage DC electrical power to a portable electrical or electronic device that is positioned at the low voltage DC charging area, and without need for an electrical cord to be coupled to the portable electrical or electronic device.

Optionally, the low voltage DC power unit includes an electrical power converter that is operable to convert incoming high voltage AC power received from the electrical power input to the low voltage DC power output.

In one aspect, the article further includes an electrical receptacle or outlet, such as a high voltage AC receptacle or a low voltage DC receptacle, which is disposed along the housing. The electrical receptacle is configured to establish a direct electrical connection upon engagement with a corresponding electrical contact of an electrical consumer. Optionally, the electrical receptacle is electrically coupled to the same electrical power input that directs power to the low voltage DC power unit. Optionally, the article includes an electronic display at the housing.

In another aspect, the low voltage power output has first and second exposed electrical conductors that are in a spaced and substantially co-planar arrangement at the low voltage DC charging area of the housing.

In yet another aspect, the low voltage power output is in the form of a wireless inductive electrical power output at the low voltage DC charging area of the housing.

In still another aspect, the housing is configured to be supported at a work surface, such as a desk or table. Optionally, a clamp is coupled to the housing and is spaced below the low voltage DC charging area. A portion of the clamp is movable and configured to engage an underside of the work surface to thereby secure the housing to the work surface.

Therefore, the present invention provides convenient and cord-free access to low voltage charging areas, in which a user need only place a portable electronic device within a certain charging area or zone along or near an electrical article in order to supply electrical current to the portable electronic device. The electrical articles that provide this access may generally be used to provide other electrical and/or electronic access within a work area or the like, so that the cord-free low voltage charging areas may be provided in areas or along surfaces that are otherwise unused in the work area. This reduces or eliminates wiring complexity, because the charging areas typically do not require their own wiring, and provides added functionality for devices that are already commonly found in work areas.

These and other objects, advantages, purposes and features of the present invention will become apparent upon review of the following specification in conjunction with the drawings.

DESCRIPTION OF THE PREFERRED EMBODIMENTS

Figures 1A, 1B, 1C:
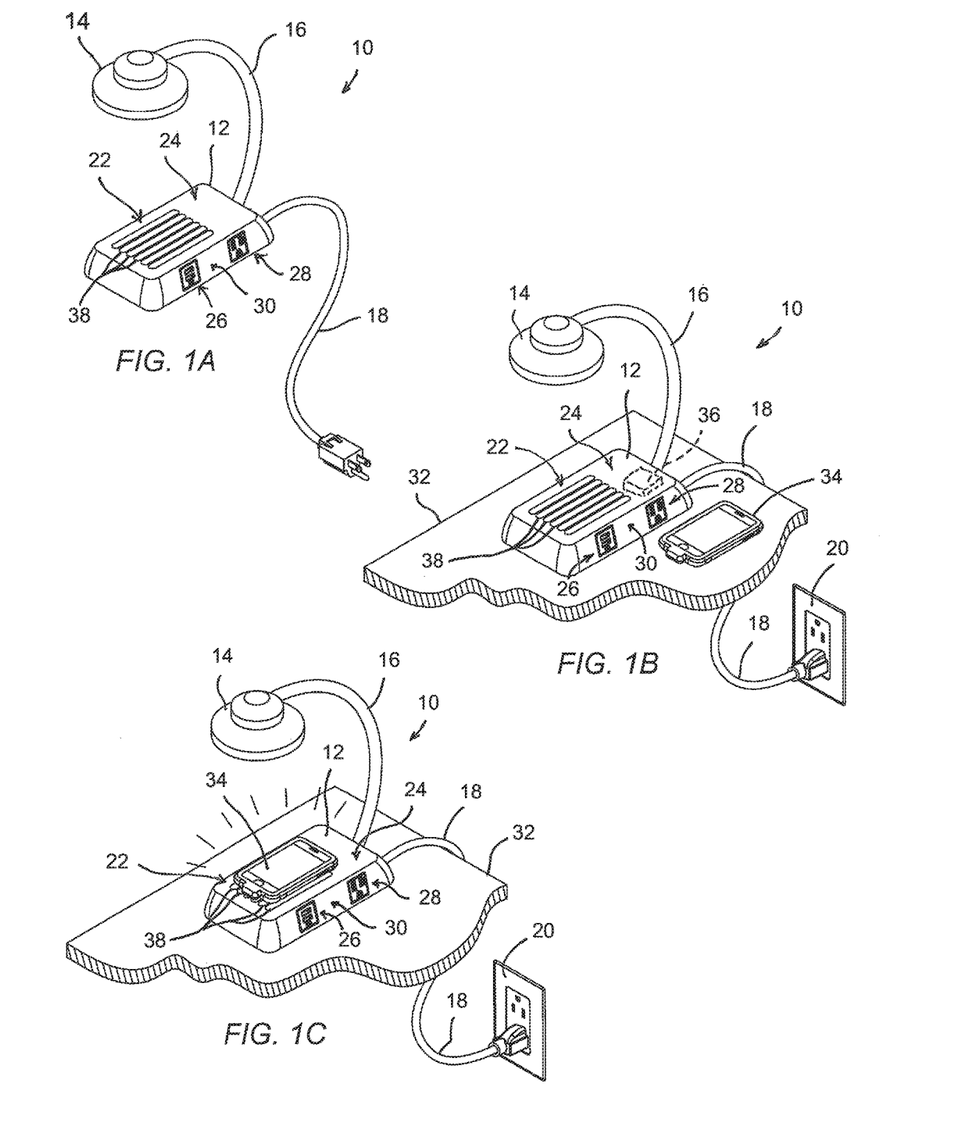
FIG. 1A is a perspective view of a desk lamp with a low voltage charging area in accordance with the present invention.
FIG. 1B is another perspective view of the desk lamp of FIG. 1A, in which the lamp is positioned along a work surface adjacent a portable electronic device.
FIG. 1C is another perspective view of the desk lamp, work surface, and electronic device of FIG. 1B, in which the electronic device is resting on the charging area and receiving electrical current from the area.

Various work area articles are equipped fitted with low voltage charging areas that permit powering and/or charging of portable electronic and/or electrical devices, such as hand-held computers, mobile phones, entertainment devices, and the like, while reducing or eliminating the need for electrical power wiring or cords to the portable devices. Referring now to the drawings and the illustrative embodiments depicted therein, an electrical article in the form of a table lamp 10 includes a housing or base 12, a lamp portion 14, and a mounting arm 16 connecting the lamp portion 14 to the base 12, the mounting arm 16 having a proximal end portion coupled to base 12 and a distal end portion coupled to lamp portion 14 (FIGS. 1A-1C). A power cord 18 serves as an electrical power input to base 12, and is directly electrically coupled to a wall-mounted high voltage AC electrical outlet 20, such as shown in FIGS. 1B and 1C. Base 12 includes a cordless charging zone 22 along an upper surface 24 of the base, and further includes a low voltage DC power receptacle or outlet 26 and a high voltage AC power receptacle or outlet 28 along a sidewall 30 of the base 12.

Base 12 is configured to rest on a work surface such as a desk or table 32, and its cordless charging zone 22 is sized and shaped to receive and support a portable electronic device 34, such as a mobile telephone, a hand-held computer and/or music and/or video entertainment device, or the like, such as shown in FIGS. 1B and 1C. An electrical power transmission unit 36 is positioned inside the housing 12. Power transmission unit 36 receives incoming high voltage AC electrical power (such as 110V or 220V) from power cord 18, and directs high and/or low voltage current (utilizing a power converter as necessary) to supply appropriate electrical power to lamp portion 14, cordless charging zone 22, low voltage power receptacle 26, and high voltage power receptacle 28.

Cordless charging zone 22 may utilize different cordless technologies to direct electrical current to portable electronic device 34. For example, charging zone 22 may employ an inductive power coupler that receives electrical power from electrical power transmission unit 36, which is compatible with an inductive power coupler associated with portable electronic device 34. It is envisioned that the inductive power couplers may be suitable for transferring sufficient electrical power across some distance of space or gap between cordless charging zone 22 and portable electronic device 34, such as if a book, clothing article, or other non-signal-blocking object were placed directly atop charging zone 22, with the portable electronic device 34 placed atop the book or object.

Optionally, charging zone 22 may employ a cordless charging pad including a plurality of low voltage DC conductive elements 38 of alternating polarity, with adjacent conductive elements being spaced apart or otherwise electrically insulated from one another (FIGS. 1A-1C). Conductive elements 38 may be substantially co-planar with one another at the charging zone 22 of the housing 12, and to reduce the likelihood of a short circuit the conductive elements having positive polarity may be positioned at least slightly above or below the conductive elements having negative polarity. The cordless charging pad is configured to supply electrical power to the portable electronic device 34 that is resting directly on the pad, such as shown in FIG. 1C. Similar charging pads are disclosed and more fully described in co-pending and commonly-owned U.S. patent application, Ser. No. 13/385,008, filed Jan. 27, 2012 (U.S. Publication No. 2012/0200989), which is hereby incorporated herein by reference in its entirety. Suitable charging pad technologies are also marketed and sold by Pure Energy Solutions, Inc. of Boulder, Colo., for example.

Low voltage power receptacle 26 may be a USB-style DC receptacle (shown), or substantially any other type of receptacle that establishes an electrical connection via direct contact with electrical contacts of an electrical consumer, such as a laptop computer, a mobile phone, handheld computer or other rechargeable device, low voltage lighting and electrical appliances, or the like, which may be electrically coupled via a power cord and/or connector. High voltage power receptacle 28 may be a conventional 110V or 220V AC receptacle, of the same or different style than that of wall outlet 20. It is envisioned that the electrical current supplying low voltage power receptacle 26, high voltage power receptacle 28, and lamp portion 14 may be routed through electrical power transmission unit 36, or may be supplied directly from power cord 18, without departing from the spirit and scope of the present invention. Optionally, one or more switches may be provided on the table lamp 10 (or other article) in order to control the lamp portion 14 or other electrical receptacles or the charging zone. Such switches may individually control power directed to respective receptacles, the charging zone, and/or the lamp portion, or may simultaneously energize and de-energize two or more of the receptacles, the charging zone, and/or the lamp portion.

Figures 2A, 2B, 2C:
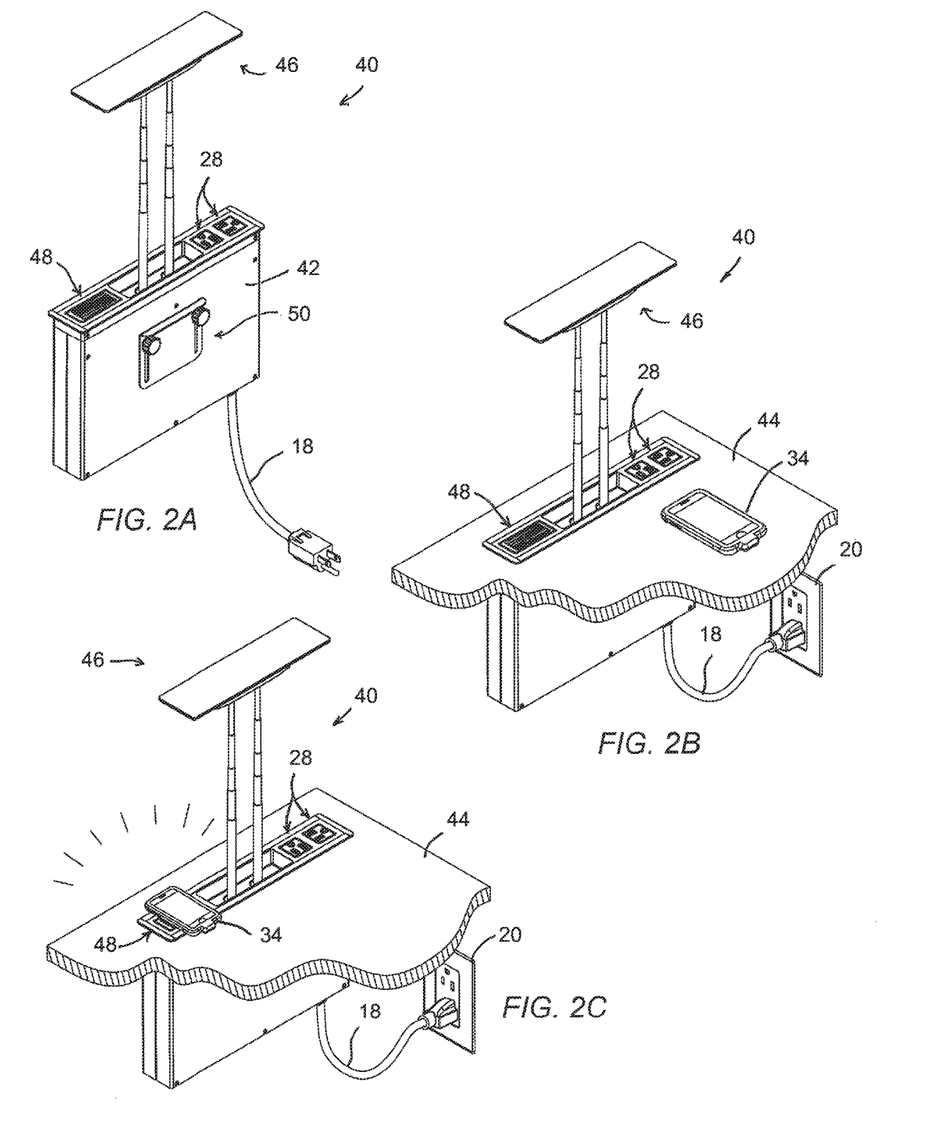
FIG. 2A is a perspective view of an aperture-mountable retractable lamp and power receptacle assembly with a low voltage charging area in accordance with the present invention.
FIG. 2B is another perspective view of the retractable lamp and power receptacle assembly of FIG. 2A, in which the assembly is positioned in an aperture in a work surface adjacent a hand-held rechargeable electronic device.
FIG. 2C is another perspective view of the retractable lamp and power receptacle assembly, work surface, and electronic device of FIG. 2B, in which the electronic device is resting on the charging area and receiving electrical current from the area.

It is envisioned that various other electrical articles may incorporate electrical charging surfaces for the cordless charging or energizing of portable electronic devices. For example, and with reference to FIGS. 2A-2C, a work surface-mounted retractable light assembly 40 includes a body or housing 42 for mounting in an opening or slot in a work surface 44. Light assembly 40 has a raisable and lowerable lamp portion 46 that, when raised, permits access to a cordless charging zone 48 and a pair of high voltage AC power receptacles 28 at an upper end of housing 42. An adjustable bracket 50 (FIG. 2A) is mounted on either side of housing 42, and allows light assembly 40 to be clamped to work surface 44. For example, cordless charging zone 48 may be an inductive power coupler, or may be a cordless charging pad including a plurality of low voltage conductive elements, similar to charging zone 22 described above. Thus, cordless charging zone 48 is operable to cordlessly convey electrical current to portable electronic device 34 when the device is placed on or sufficiently close to the cordless charging zone 48, such as shown in FIG. 2C. Other details, features, and aspects of the retractable light assembly 40 are more fully described in commonly-owned U.S. Pat. No. 8,721,124, which is hereby incorporated herein by reference in its entirety.

Figure 3A:
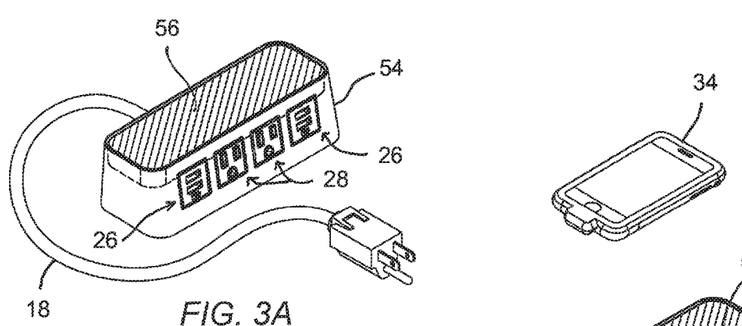
FIG. 3A is a perspective view of an surface-supportable electrical power unit with low voltage charging area in accordance with the present invention.
Figure 3B:
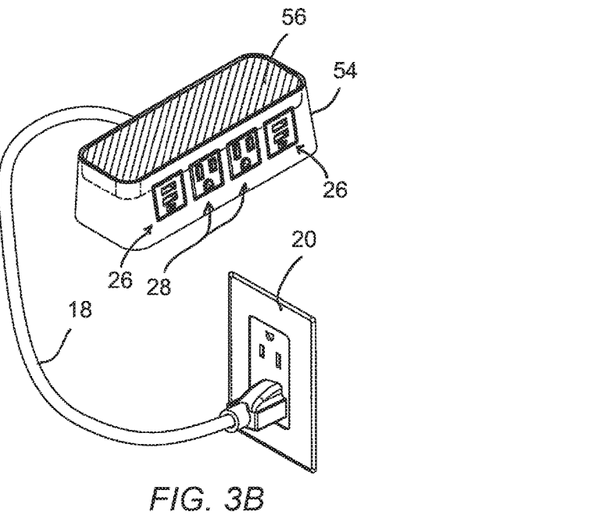
FIG. 3B is another perspective view of the electrical power unit of FIG. 3A, in which the electrical power unit is electrically energized via a conventional wall outlet and a hand-held rechargeable electronic device is spaced above the electrical power unit.
Figure 3C:
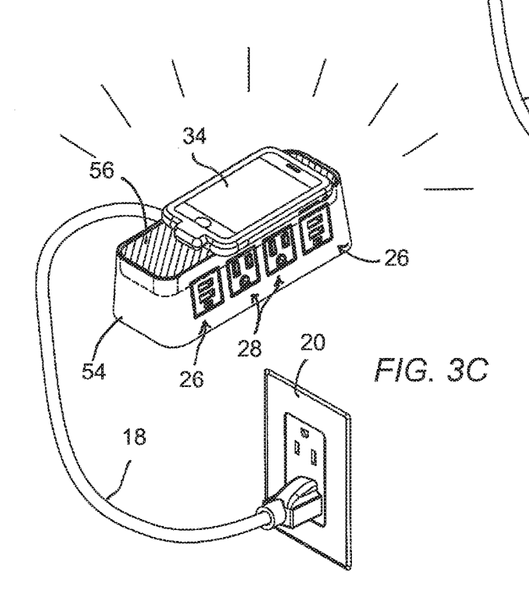
FIG. 3C is another perspective view of the electrical power unit and electronic device of FIG. 3B, in which the electronic device is resting on the charging area and receiving electrical current from the area.

Referring to FIGS. 3A-3C, a work surface-supported power and/or data center 52 includes a housing 54 having a pair of low voltage DC and/or data receptacles 26, a pair of high voltage AC power receptacles 28, a power cord 18, and a cordless charging zone 56 forming substantially the entire upper surface of the power and/or data center 52. A power cord 18 supplies electrical power to the power and/or data center 52, which is operable to convey electrical current to a portable electronic device 34 placed atop the outlet center (FIG. 3C), such as in a manner described above.

Figure 4A:
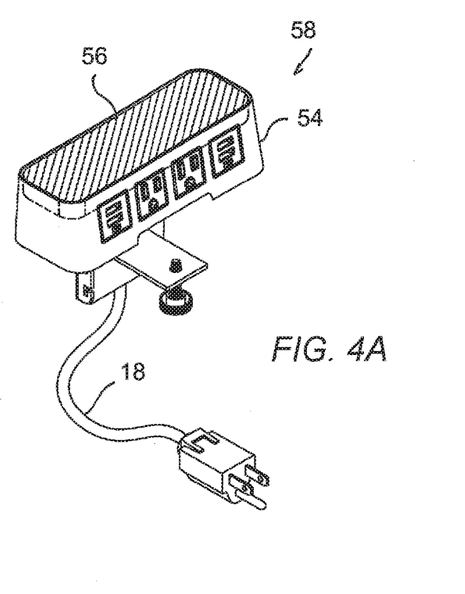
FIG. 4A is a perspective view of an edge-mountable electrical power unit with low voltage charging area in accordance with the present invention.
Figure 4B:
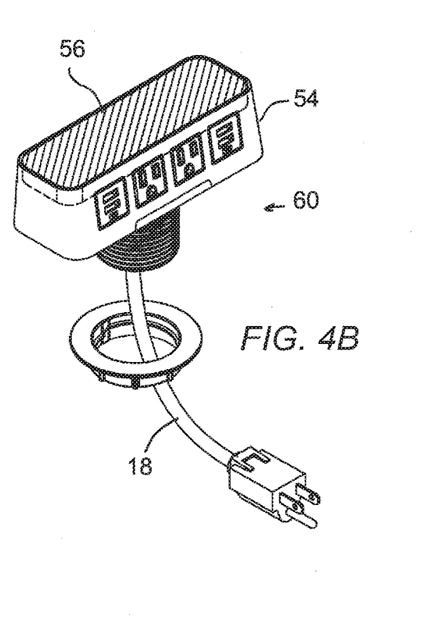
FIG. 4B is a perspective view of an aperture-mountable electrical power unit with low voltage charging area in accordance with the present invention.

Various other types of work surface-supported power and/or data outlet centers are envisioned, which would have different mounting arrangements, but functional and electrical attributes would be similar or substantially identical to those described above. For example, an edge-mountable power and/or data center 58 (FIG. 4A) and a hole-mountable power and/or data center 60 (FIG. 4B) may be electrically and structurally identical to one another, except for the base or mounting hardware, which may be interchangeable with the same housing 54, such as in a manner that is more fully described in commonly-owned U.S. Pat. No. 6,379,182, and in U.S. patent application, Ser. No. 14/269,247, filed May 5, 2014, both of which are hereby incorporated herein by reference in their entireties.

Figure 4C:
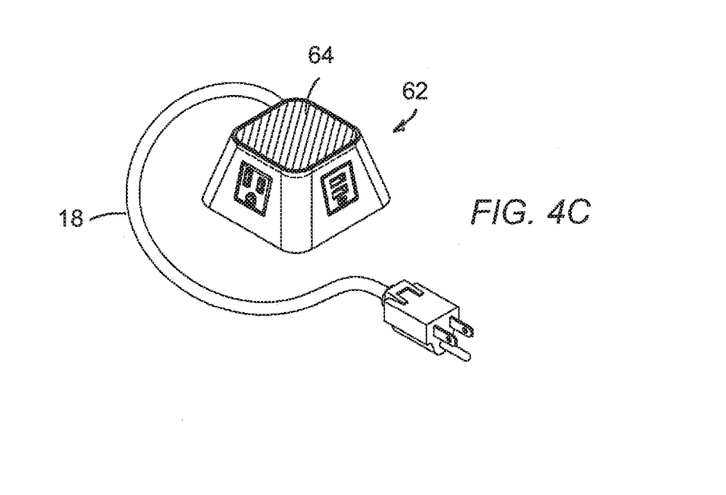
FIG. 4C is a perspective view of another surface-supportable electrical power unit with low voltage charging area in accordance with the present invention.
Figure 5A:
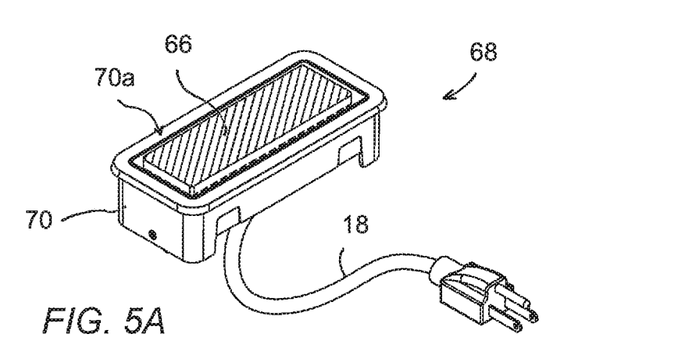
FIG. 5A is a perspective view of a pop-up style aperture-mountable electrical power unit with low voltage charging area in accordance with the present invention, shown in a closed configuration.
Figure 5B:
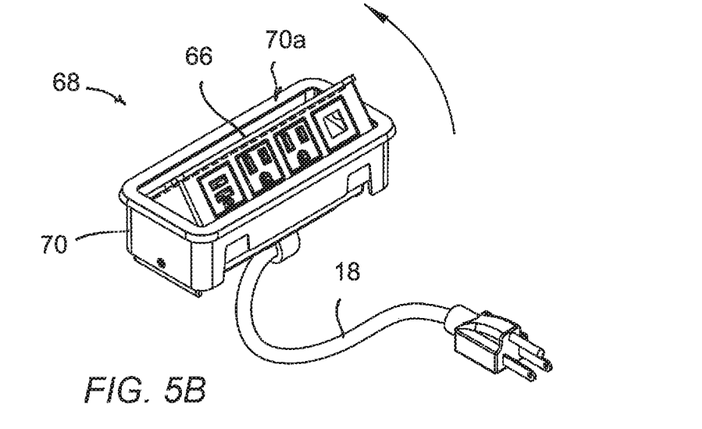
FIG. 5B is a perspective view of the electrical power unit of FIG. 5A, shown in an open configuration.

Work surface-supported power and/or data outlet centers may be sized and shaped as desired, and may include substantially any number and/or style of power and/or electronic data outlets. For example, and with reference to FIG. 4C, another power and/or data outlet center 62 is generally square in shape when viewed from above (and trapezoidal when viewed from the side), and can support at least one power or data outlet on each side, with a generally square cordless charging zone 64 at its top surface. Another cordless charging zone 66 may be incorporated into a surface of a pop-up power and/or data outlet center 68 that retracts into a work surface (FIGS. 5A and 5B), such as in a manner that is more fully described in commonly-owned U.S. Pat. No. 8,295,036, which is hereby incorporated herein by reference in its entirety. Cordless charging zone 66 may be utilized in the closed position of FIG. 5A when charging zone 66 is substantially horizontal, and may also be utilized in the open position of FIG. 5B, when charging zone 66 is sloped, such as by partially supporting the portable electronic device at a bezel or flange portion 70a of a housing 70 of the power and/or data center 68.

Figure 6:
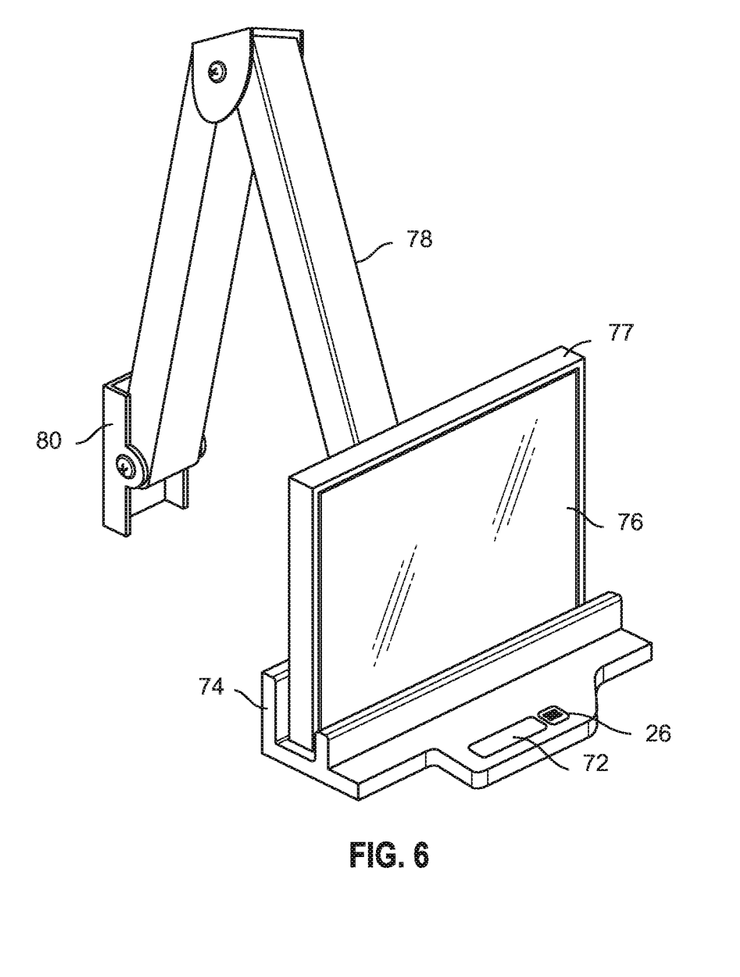
FIG. 6 is a perspective view of a video display unit with low voltage charging area in accordance with the present invention.

Optionally, and with reference to FIG. 6, another cordless charging zone 72 may be incorporated into a support tray 74 for a video display 76 such as a television or computer monitor or the like. In the embodiment of FIG. 6, video display 76 is mounted on support tray 74, which in turn is coupled to a wall surface via an articulating arm 78 and a mounting bracket 80. Optionally, it is envisioned that the display could be mounted at a desk or other work surface, or in another manner, with the power supplied to video display 76 also being used to supply power to cordless charging zone 72. Optionally, low voltage outlets 26 may be provided along the support tray 74, as well as high voltage outlets or other power and/or data receptacles. Optionally, an outer housing 77 for the display 76 may incorporate a cordless charging zone and any additional electrical outlets.

Figure 7:
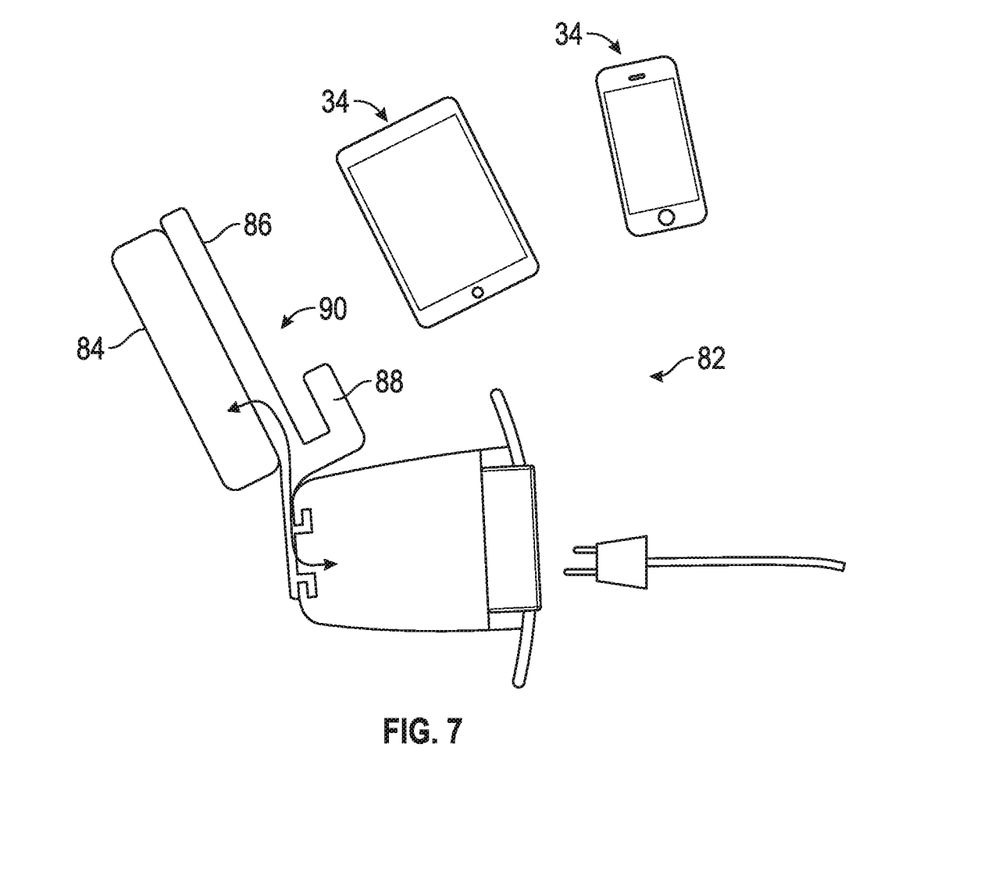
FIG. 7 is a side elevation of an electrical power unit with low voltage charging area in accordance with the present invention.

Other types of electrical articles that can be adapted to incorporate cordless charging zones include another power and/or data center 82 (FIG. 7), in which an electrical power transmission unit 84 is mounted to a device support 86 that is configured to support a portable electronic device 34 in an upright orientation. Device support 86 includes a lower cradle portion 88 that retains the portable electronic device(s) 34, and defines a cordless charging zone 90 that is aligned with transmission unit 84. Device support 86 thus allows the devices 34 to be recharged and/or energized by transmission unit 84 while the devices remain in an upright orientation for use. Power and/or data center 82 may be similar to those which are more fully described in commonly-owned U.S. Pat. No. 7,736,178, for example, which is hereby incorporated herein by reference in its entirety.

Accordingly, the electrical articles of the present invention provide cordless charging zones for portable electronic devices within a work area or the like. When the cordless charging zone is energized, the portable electronic device can be placed atop or in the charging zone in order to convey electrical current to the device, without the need for additional connections. At the same time, the electrical articles may provide other functions and/or access to high or low voltage power at traditional direct-contact receptacles or the like.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical article for use in a work area, said electrical article comprising:
 a support housing including an upper surface, said support housing configured to support a video display device on a first portion of said upper surface, wherein said first portion of said upper surface comprises a retaining fixture configured to retain and support said video display device in a substantially vertical orientation;
 a cordless charging zone defined along a second portion of said upper surface, wherein said second portion is spaced apart from said first portion, and wherein said second portion is configured to support a portable electronic device;
 an electrical power transmission unit disposed in said support housing and having a cordless power output at said cordless charging zone;
 an electrical power input configured to direct electrical power from a power source to said electrical power transmission unit; and wherein said electrical power transmission unit is operable to cordlessly convey electrical power to the portable electronic device positioned at said cordless charging zone.

2. The electrical article of claim 1, further comprising an electrical outlet disposed along said support housing, wherein said electrical outlet is configured to establish a direct electrical connection upon engagement with a corresponding electrical contact associated with an electrical consumer, and wherein said electrical power input is further configured to direct electrical power from the power source to said electrical outlet.

3. The electrical article of claim 2, wherein said electrical outlet comprises a high voltage AC outlet, and wherein said high voltage AC outlet comprises one chosen from (i) a 110-volt outlet, (ii) a 220-volt outlet, and (iii) a light socket.

4. The electrical article of claim 3, wherein said electrical outlet further comprises a low voltage DC outlet.

5. The electrical article of claim 4, wherein said electrical power transmission unit comprises an electrical power converter configured to convert incoming high voltage AC power received from said electrical power input to low voltage DC power output directed to said cordless power output and to said low voltage DC outlet, and wherein said electrical power input comprises an electrical cord configured to carry high voltage AC current.

6. The electrical article of claim 2, wherein said electrical outlet comprises a low voltage DC outlet.

7. The electrical article of claim 1, wherein said cordless power output comprises a wireless inductive electrical power output.

8. An electrical article for use in a work area, said electrical article comprising:
a support housing including an upper surface, said support housing configured to support a video display device on a first portion of said upper surface, wherein said support housing is configured for coupling to a wall surface and further comprises an articulating arm and mounting bracket;
a cordless charging zone defined along a second portion of said upper surface, wherein said second portion is spaced apart from said first portion, and wherein said second portion is configured to support a portable electronic device;
an electrical power transmission unit disposed in said support housing and having a cordless power output at said cordless charging zone;
an electrical power input configured to direct electrical power from a power source to said electrical power transmission unit; and
wherein said electrical power transmission unit is operable to cordlessly convey electrical power to the portable electronic device positioned at said cordless charging zone.

9. The electrical article of claim 1, wherein said support housing is configured for mounting at a desk or other work surface.

10. An electrical article for use in a work area, said electrical article comprising:
a support housing configured to support a portable electronic device in an upright orientation in which a display screen of the portable electronic device is substantially vertical, wherein said support housing comprises a lower cradle portion having a channel configured to receive an edge portion of said portable electronic device to hold said portable electronic device in said upright orientation, wherein said lower cradle portion defines an upright cordless charging zone, and wherein said lower cradle portion is configured to position said portable electronic device at said charging zone when said portable electronic device is retained by said channel in said upright orientation;
an electrical output module disposed below said lower cradle portion, and comprising a bracket configured for attachment to a surface in the work area;
an electrical power transmission unit coupled to said support housing and having a cordless power output at said cordless charging zone;
an electrical power input configured to direct electrical power from a power source to said electrical power transmission unit; and
wherein said electrical power transmission unit is operable to cordlessly convey electrical power to said portable electronic device positioned at said charging zone when retained by said channel in said upright orientation.

11. The electrical article of claim 10, wherein said electrical output module comprises an electrical outlet configured to establish a direct electrical connection upon engagement with a corresponding electrical contact associated with an electrical consumer, and wherein said electrical power input is further configured to direct electrical power from said power source to said electrical outlet.

12. The electrical article of claim 11, wherein said electrical outlet comprises a high voltage AC outlet, and wherein said high voltage AC outlet comprises one chosen from (i) a 110-volt outlet, (ii) a 220-volt outlet, and (iii) a light socket.

13. The electrical article of claim 12, wherein said electrical outlet further comprises a low voltage DC outlet.

14. The electrical article of claim 13, wherein said electrical power transmission unit comprises an electrical power converter configured to convert incoming high voltage AC power received from said electrical power input to low voltage DC power output directed to said cordless power output and to said low voltage DC outlet.

15. The electrical article of claim 14, wherein said electrical power input comprises an electrical cord configured to carry high voltage AC current.

16. The electrical article of claim 11, wherein said electrical output module comprises a low voltage DC outlet in electrical communication with said electrical power input.

17. The electrical article of claim 10, wherein said cordless power output comprises a wireless inductive electrical power output at said charging zone of said support housing.

18. The electrical article of claim 10, wherein said support housing is configured for coupling to a wall surface.

19. The electrical article of claim 10, wherein said support housing is configured for mounting at a desk or other work surface.

* * * * *